Figure 1:
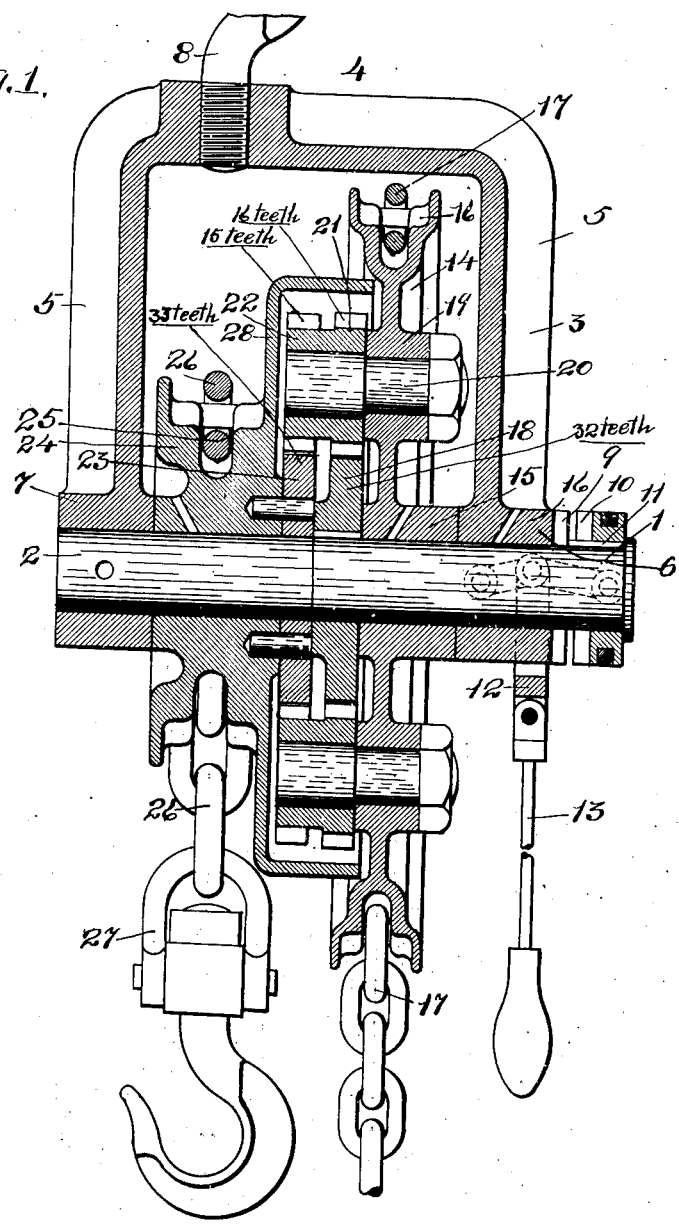

No. 826,449.

PATENTED JULY 17, 1906.

C. E. STEERE.
POWER TRANSMISSION GEAR.
APPLICATION FILED JAN. 19, 1906.

2 SHEETS—SHEET 1.

WITNESSES:
Oscar W. Bond
Frances M. Frost

INVENTOR
Clarence E. Steere
BY Banning & Banning
ATTORNEYS

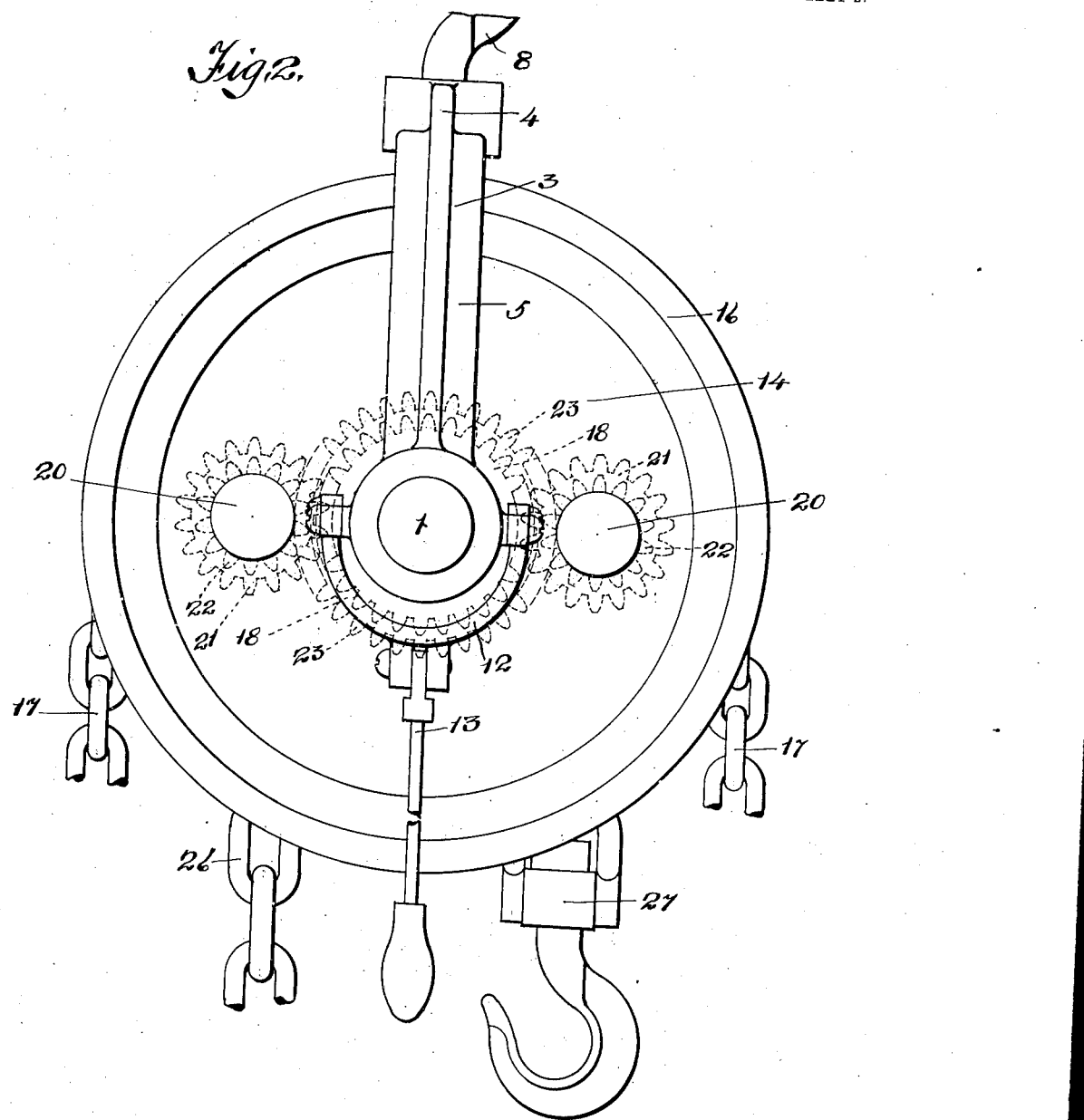

UNITED STATES PATENT OFFICE.

CLARENCE E. STEERE, OF MAYWOOD, ILLINOIS.

POWER-TRANSMISSION GEAR.

No. 826,449.

Specification of Letters Patent.

Patented July 17, 1906.

Application filed January 19, 1906. Serial No. 296,824.

*To all whom it may concern:*

Be it known that I, CLARENCE E. STEERE, a citizen of the United States, residing at Maywood, in the county of Cook and State of Illinois, have invented certain new and useful Improvements in Power-Transmission Gears, of which the following is a specification.

The gear mechanism of the present invention can be applied to any field in which it is desired to provide differential power-transmission mechanism of simple construction, of compact form, and adapted to transmit power from one shaft to another which forms a continuation of the power-shaft and is located in the same axial line.

The invention shown is applied to a hoisting block or tackle; but it will be understood that the invention is not limited to hoisting purposes, but may be applied in many different capacities. The arrangement of gears is one which allows of an infinite variation in the speed of power-transmission by merely changing the proportionate ratio of teeth between the several gears, and the device is one which when used for hoisting purposes admits of a free return by the operation of suitable clutch mechanism, adapting the hoisting-block to be dropped at a very rapid rate, regardless of the time required in raising it.

Another feature of the present invention is the fact that the weight serves to lock the mechanism when the clutch is thrown, so that it is not necessary to furnish a continuous tension on the power or hoisting chain to prevent return of the weight.

Another feature of the invention is the provision of power and weight shafts in the same axial line, which greatly simplifies the method of mounting the shafts, provides a compact arrangement of gearing, reduces the friction to a minimum, and is on the whole a much more scientific and efficient method of transmitting power than is ordinarily employed.

The invention consists in the gear mechanism adapted to transmit differential speeds as hereinafter described, to the method of mounting the gears on shafts having the same axial line, and to the construction and arrangement of the hoisting-block to which the gear mechanism is applied in the present instance; and the invention further consists in the features of construction and combination of parts hereinafter described and claimed.

In the drawings, Figure 1 is a longitudinal sectional view of the gear mechanism applied to a hoisting-block, and Fig. 2 a side elevation of the same.

The gears are carried by independently-movable shafts 1 and 2, the former of which may for convenience be termed the "power-shaft" and the latter the "weight-shaft." The two shafts are carried by a yoke 3, having a cross-head 4 and depending side arms 5, terminating in journal-boxes 6 and 7, in which the shafts are mounted. The cross-head has entered thereinto a hook 8 for supporting the hoisting-block in any suitable manner. The journal-box 6 has on its outer face a fixed clutch member 9, which coöperates with a slidable clutch member 10, which is slidably keyed to the shaft 1 by means of a key 11 and is movable by means of a yoke 12, actuated by a hand-lever 13, or in any other suitable manner.

The power-shaft has rotatably mounted thereon a power sheave or pulley 14, consisting of a hub 15 and channeled rim 16, adapted to receive the hoisting chain or cable 17, which passes around the sheave. The power-shaft has keyed thereto a power gear-wheel 18, which for purposes of convenience we may assume to have thirty-two teeth. The power-sheave is provided on diametrically opposite sides with bosses 19, through which pass rigid stud-shafts 20, upon which are mounted integrally-formed planetary gear-wheels 21 and 22 of different diameter, the former of which may for purposes of illustration be assumed to have sixteen teeth, which mesh with the teeth of the power gear-wheel, and the latter of which may be assumed to have fifteen teeth, which mesh with the teeth of a weight-transmission gear-wheel 23, mounted on the inner end of the weight-shaft 2. The weight-transmission gear-wheel may be assumed to have thirty-three teeth, and it will be noted that the sum-total of the intermeshing teeth of the two sets of gear is equal in each case, the larger transmission gear-wheel meshing with the smaller planetary gear-wheel, and vice versa. The weight-transmission gear-wheel is rigidly secured to or formed integral with the weight-sheave 24, which is provided with a channel 25 around its periphery for the passage of a weight-chain 26, having on its end a hook 27 of the usual character. The weight-shaft is preferably provided with a peripheral flange 28, which forms a housing for the gear-wheels and serves to protect them to some extent from injury from dust, dirt, or other cause.

The weight-sheave and weight-transmission gear-wheel can be either integrally formed or rigidly secured together and it is immaterial whether the sheave revolves around the shaft or revolves with the shaft.

In operation when it is desired to lift a heavy weight by the expenditure of a small amount of power the clutch is thrown into closed position, which locks the power-shaft within its journal-mounting and with it the power gear-wheel 18 with its thirty-two teeth. By applying power to the hoisting-chain the power-sheave will be revolved and with it the two sets of planetary gears. The power gear-wheel 18 being locked will compel the rotation of the planetary gears around their own axes. During one complete revolution of the planetary gear-wheels the sixteen toothed planetary gears will measure off sixteen teeth of the thirty-two on the locked power gear-wheel. During the same period the fifteen-toothed planetary gear-wheels will measure off fifteen teeth of the thirty-three-toothed weight-transmission gear-wheel, which being revolubly mounted must of necessity be moved a proportionate distance. During one complete revolution of the power-sheave the planetary gears will be revolved around their own axes two times. The fifteen-toothed planetary gear-wheels will of course be moved to the same extent, which amounts to the movement of twice fifteen or thirty teeth of the smaller planetary gear-wheel past a given point, or, in other words, the smaller planetary gear-wheel will during one complete revolution of the power-sheave have measured off thirty teeth on the thirty-three-toothed transmission-gear wheel, which must of necessity be revolved a considerable distance around its axis in the direction of movement of the planetary gears to allow for the passage of thirty teeth around the periphery of a wheel having thirty-three teeth. The nearer the ratio between the two sets of intermeshing gears the less will be the proportionate movement of the weight-sheave and the greater will be the amount of weight capable of being raised by the expenditure of a given amount of power. This ratio can be infinitely varied by changing the gear-wheels, and the arrangement of gears herein explained can be quite as easily employed in the ratio of one hundred to one as in the ratio heretofore described. In the present instance the weight-transmission gear-wheel during one revolution of the power-sheave will have moved three teeth in the same line of travel as the planetary gears, which is three-thirtieths of the number of engaging teeth on the smaller planetary when twice revolved, and the ratio of power-transmission can always be determined by dividing the total number of engaging teeth of the smaller planetary gear 22 by the number of teeth representing the movement of the weight-transmission gear-wheel 23, or, in other words, the gears give a proportionate ratio of ten to one. In the present case the power-sheave is twice the diameter of the weight-sheave, so that the proportion of ten to one is increased by this circumstance to the ultimate proportion of twenty to one, indicating that one pound of tension on the power-chain will be sufficient to hoist twenty pounds of weight disregarding loss due to friction.

It will be noted that the smaller planetary gear meshes with the larger gear-wheel in the present instance and that during two revolutions of the fifteen-toothed planetary gear around its own axis measures off but thirty out of thirty-three teeth on the movable gear-wheel with which it meshes. This forces the movable gear-wheel a distance of three teeth around its own axis during the revolution of the planetary gears around their center of motion, and this movement of the movable gear-wheel will be in the same direction that the planetary gears are traveling. This constitutes a lock which prevents the weight from returning by the removal of the tension on the power-sheave, since the tendency of the weight will be to revolve the weight-transmission gear-wheel in the same direction in which it is revolved while the weight is being raised. Of course the weight cannot raise itself, so that it will be locked against a return movement. This locking only takes place where the number of teeth measured off by the planetary gear 22 on the movable gear-wheel during one complete revolution around the central axis is less than the total number of teeth on the movable gear-wheel. If the planetary gears, on the other hand, measured off more than the number of teeth on the movable gear-wheel, the tendency will be to move such gear-wheel in a reverse direction rather than in the same direction, and under these circumstances the weight will not be locked, but will tend to return when the tension is relieved. Either arrangement of the gears can be employed, and the ratios of movement can be determined in the same way, and in some cases it will be found advisable to employ gear-wheels of proper ratio to allow of a return movement of the weight, while in other cases it will be found advisable to employ a ratio which locks the weight against return.

By throwing the clutch out the shaft 1 and the power-transmission gear will be allowed to revolve freely, which permits the rapid descent of the tackle, the planetary gears meanwhile revolving on their own axes without any movement around a common center. In describing the device of the present invention reference has been made to the fact that the total number of intermeshing teeth of one of the planetary gears with its coöperating central gear is equal in each case. It is obvious, however, that the same result might be obtained by dividing the size of the intermeshing teeth in one instance or the other, which of course would double the total number of intermeshing teeth without in any way changing their relation to one another. Where the term "equal number of teeth" is employed in the claims or elsewhere, it will be understood that such language refers to cases in which the teeth in both trains of gear are of the same size. The claims, however, are intended by this language to cover all cases in which the number of teeth in one train is merely multiplied in number and reduced in size, and that the claims are also intended to cover cases in which the same result is accomplished by mere imperfection in the mesh of one train of gear as compared with the other. It is appreciated that the total number of teeth in one train of gear as compared with the total number in the other might be slightly varied by allowing for a slight amount of lost motion in one case or the other, and the claims are intended to cover any and all such obviously equivalent arrangements which may be employed to effect the same result. It will be further understood that in calculating the total number of intermeshing teeth reference is had to but one set of planetary gears, and that other sets of planetary gears of the same character may be located at different points around the circumference of the power-sheave for the purpose of balancing the distribution of the driving force, and that such additional gears are not to be taken into account in calculating the number of intermeshing teeth.

What I claim as new, and desire to secure by Letters Patent, is—

1. In a hoisting mechanism, the combination of a supporting yoke or frame, a power-shaft journaled therein, a weight-shaft journaled therein, the two shafts having the same axial line, a power-sheave revolubly mounted on the power-shaft, a power gear-wheel fixedly secured to the shaft, a weight-sheave, and a weight-transmission gear-wheel, the latter having a number of teeth proportionate to the number of teeth of the power gear-wheel, planetary gear-wheels carried by and revoluble with the power-sheave, said planetary gears having a difference in number of teeth proportionate to the number of teeth of the gear-wheels with which they mesh, substantially as described.

2. In a hoisting mechanism, the combination of a supporting yoke or frame, a power-shaft journaled therein, a weight-shaft journaled therein, the two shafts having the same axial line, a power-sheave revolubly mounted on the power-shaft, a power gear-wheel fixedly secured to the shaft, a weight-sheave, and a weight-transmission gear-wheel, the latter having a number of teeth proportionate to the number of teeth of the power gear-wheel, planetary gear-wheels carried by and revoluble with the power-sheave, said planetary gears having a difference in number of teeth equal to the difference in the number of teeth of the gears with which they mesh, the total number of meshing teeth being equal in each case, substantially as described.

3. In a hoisting mechanism, the combination of a supporting yoke or frame, a power-shaft journaled therein, a weight-shaft journaled therein, the two shafts having the same axial line, a power-sheave revolubly mounted on the power-shaft, a power gear-wheel fixedly secured to the shaft, a weight-sheave, and a weight-transmission gear-wheel, the latter having a number of teeth proportionate to the number of teeth of the power gear-wheel, planetary gear-wheels carried by and revoluble with the power-sheave said planetary gears having a difference in number of teeth equal to the difference in the number of teeth of the gears with which they mesh, the total number of meshing teeth being equal in each case, and a clutch for locking the power-shaft to the yoke or frame, substantially as described.

4. In a hoisting mechanism, the combination of a supporting yoke or frame, a power-shaft journaled therein, a weight-shaft journaled therein, the two shafts having the same axle line, a power-sheave revolubly mounted on the power-shaft, a power gear-wheel fixedly secured to the shaft, a weight-sheave and a weight-transmission gear-wheel, planetary gear-wheels carried by and revoluble with the power-sheave and meshing with the power and weight gear-wheels, the two sets of intermeshing gears having a proportionate ratio to each other for measuring off, during one complete revolution of the power-sheave, less than the total number of teeth on the weight-transmission gear-wheel for rotating the weight-sheave in the same direction as the movement of the power-sheave, thereby providing a lock against the return of the weight, substantially as described.

CLARENCE E. STEERE.

Witnesses:
WALKER BANNING,
OSCAR W. BOND.